(12) United States Patent
Batura et al.

(10) Patent No.: US 10,291,363 B2
(45) Date of Patent: May 14, 2019

(54) METHOD FOR SIMULTANEOUS CONFIRMATION OF MANY MESSAGES IN LOW POWER WIDE AREA NETWORKS, AND USE OF CORRECTION OF FREQUENCY WHEN TRANSMITTING DATA OVER UNB LPWAN NETWORKS, BASED ON ANALYSIS OF DATA OBTAINED ON RECEIVING

(71) Applicants: Danylo Batura, Mytishchi (RU); Vasiliy Anisimov, Moscow (RU)

(72) Inventors: Danylo Batura, Mytishchi (RU); Vasiliy Anisimov, Moscow (RU)

(73) Assignee: WAVIOT INTEGRATED SYSTEMS, LLC, Watertown, SD (US)

( * ) Notice: Subject to any disclaimer, the term of this patent is extended or adjusted under 35 U.S.C. 154(b) by 0 days.

(21) Appl. No.: 15/858,784

(22) Filed: Dec. 29, 2017

(65) Prior Publication Data
US 2018/0191468 A1 Jul. 5, 2018

Related U.S. Application Data

(60) Provisional application No. 62/440,946, filed on Dec. 30, 2016.

(51) Int. Cl.
| | | |
|---|---|---|
| H04L 1/18 | (2006.01) | |
| H04B 7/08 | (2006.01) | |
| H04L 25/03 | (2006.01) | |
| H04L 12/28 | (2006.01) | |
| H04L 12/58 | (2006.01) | |

(52) U.S. Cl.
CPC ......... *H04L 1/1819* (2013.01); *H04B 7/0854* (2013.01); *H04L 12/2852* (2013.01); *H04L 25/03343* (2013.01); *H04L 12/2879* (2013.01); *H04L 51/043* (2013.01)

(58) Field of Classification Search
CPC ............... H04L 1/1819; H04L 12/2852; H04L 25/03343; H04L 12/2879; H04L 51/043; H04L 1/18; H04L 25/03; H04L 27/18; H04L 27/24; H04L 27/06; H04B 7/0854; H04B 7/08; H04B 7/2687; H04B 7/02; H04B 7/00; H04B 7/0817; H04B 1/406; H04W 56/001; H04W 56/002; H04W 56/0035; H04W 52/0225; Y02D 70/40; Y02D 70/00; Y02D 70/144; Y02D 70/146; Y02D 70/162; Y02D 70/142
See application file for complete search history.

(56) References Cited

U.S. PATENT DOCUMENTS

| | | |
|---|---|---|
| 5,668,837 A | 9/1997 | Dent |
| 5,960,040 A | 9/1999 | Cai et al. |
| 5,974,098 A | 10/1999 | Tsuda |
| 6,115,728 A | 9/2000 | Nakai et al. |
| 7,508,889 B2 | 3/2009 | Liu |
| 8,156,209 B1 | 4/2012 | Phadnis et al. |
| 9,049,732 B2 | 6/2015 | Fourtet et al. |
| 9,252,998 B2 | 2/2016 | Seely |
| 10,044,098 B2 | 8/2018 | Ali |
| 2003/0224725 A1 | 12/2003 | Limberg |
| 2004/0096021 A1* | 5/2004 | Koval ................. H04L 27/24 375/350 |
| 2005/0188129 A1 | 8/2005 | Abdelilah et al. |
| 2006/0094383 A1 | 5/2006 | Zylowski |
| 2006/0133827 A1 | 6/2006 | Becouarn et al. |
| 2006/0251190 A1 | 11/2006 | Wang et al. |
| 2006/0285607 A1 | 12/2006 | Strodtbeck et al. |
| 2007/0268980 A1 | 11/2007 | Brannstorm et al. |
| 2007/0280098 A1 | 12/2007 | Bhatt et al. |
| 2008/0151985 A1 | 6/2008 | Chin et al. |
| 2008/0240285 A1 | 10/2008 | Han et al. |
| 2011/0032920 A1 | 2/2011 | Suberviola |
| 2011/0289156 A1 | 11/2011 | Pirnazar |
| 2012/0014488 A1 | 1/2012 | Liu et al. |
| 2012/0051287 A1 | 3/2012 | Merlin et al. |
| 2012/0195184 A1 | 8/2012 | Dapper et al. |
| 2013/0202068 A1* | 8/2013 | Ly-Gagnon ....... H04W 52/0225 375/343 |
| 2015/0092753 A1* | 4/2015 | Gupta ................. H04W 56/001 370/336 |
| 2016/0119184 A1 | 4/2016 | Soriaga et al. |

(Continued)

FOREIGN PATENT DOCUMENTS

| | | |
|---|---|---|
| CN | 106341876 A | 1/2017 |
| CN | 107135554 A | 9/2017 |

(Continued)

OTHER PUBLICATIONS

Kerlink, Wirnet Station, Embedded Base Station Controller and Radio Network Controller, for remote operations, retrieved from https://www.kerlink.com/product/wirnet-station/ on Sep. 13, 2018.
Sigfox Wireless Ethernet Gateway, retrieved from https://partners.sigfox.com/products/sigfox-wireless-ethernet-gateway, on Sep. 13, 2018.
Device—Wireless Gecko by Silicon Labs—information retrieved from https:/1www.silabs.com/products/wireless/wireless-gecko-iot-connectivity-portfolio on Aug. 15, 2018.
Device—AX5043—Advanced High Performance ASK and FSK Narrow-band Transceiver for 27-1050 MHz Range, Or Semiconductor, retrieved from https:/1www.onsemi.com/pub/Collateral/AX5043-D.PDF on Aug. 15, 2018.

(Continued)

*Primary Examiner* — Hardikkumar D Patel
(74) *Attorney, Agent, or Firm* — BCF LLP

(57) ABSTRACT

Described is a method for joint confirmation of many messages in Low Power Wide Area Networks (LPWANs) including adding information on order of messages in transmitted data, parsing order data in messages on a receiving side, sending system message back to original transmitter where information on reception success is encoded bitwise in data field, so that each bit represents one successfully received message.

4 Claims, No Drawings

(56) References Cited

U.S. PATENT DOCUMENTS

| | | |
|---|---|---|
| 2016/0335897 A1 | 11/2016 | Naserian et al. |
| 2016/0373138 A1 | 12/2016 | Li et al. |
| 2017/0139053 A1 | 5/2017 | Vishin et al. |
| 2017/0171841 A1 | 6/2017 | Chen et al. |

FOREIGN PATENT DOCUMENTS

| | | |
|---|---|---|
| WO | 2012027880 A1 | 3/2012 |
| WO | 2017197441 A1 | 11/2017 |
| WO | WO2017197441 | 11/2017 |

OTHER PUBLICATIONS

Wenxu Zhang et al., "Application of FFT parallel code phase search algorithm in GNSS software" 2016 IEEE 13th International Conference on Signal Processing (ICSP). Online at https://ieeexplore.ieee.org/abstract/document/7878011/.

Notice of Allowance with regard to the counterpart U.S. Appl. No. 16/220,188 dated Feb. 13, 2019.

\* cited by examiner

METHOD FOR SIMULTANEOUS
CONFIRMATION OF MANY MESSAGES IN
LOW POWER WIDE AREA NETWORKS,
AND USE OF CORRECTION OF
FREQUENCY WHEN TRANSMITTING DATA
OVER UNB LPWAN NETWORKS, BASED ON
ANALYSIS OF DATA OBTAINED ON
RECEIVING

PRIORITY CLAIM/INCORPORATION BY
REFERENCE

The present application claims priority to U.S. Provisional Patent Applications: 62/440,946 filed on Dec. 30, 2016 entitled "A method for simultaneous confirmation of many messages in low power wide area networks; and hereby incorporates by reference, the entire subject matter of these Provisional Application.

BACKGROUND INFORMATION

LPWANs typically operate in harsh conditions, especially in cities. Many applications of LPWAN transceivers require them being placed in buildings or even under earth surface. Because of this, it is unrealistic to expect successful delivery of all sent messages. On the other side, it is impossible to confirm delivery of all messages, because no matter how small a confirmation message would be, overhead needed to send just one bit of information will still be too large.

SUMMARY

The exemplary embodiment relates to a method of joint confirmation of many messages in LPWAN. Confirmation of most messages could be delayed, so it is possible to confirm many messages at once. This requires presence of messages order information in each message, so that a receiving side could determine if messages were either not received, or simply not sent. This information adds some overhead, but overall, it is much more effective than sending a confirmation after every message.

A radio signal receiver determines a frequency of received signal and, knowing at which frequency transmission was to be performed, calculates error of frequency of received signal. When sending data in opposite direction, this error is used to calculate necessary frequency correction. This makes possible to compensate for a total overall error of master generators of receiver and transmitter and to perform transmission of radio signal exactly at a frequency at which reception is being performed.

DETAILED DESCRIPTION

The exemplary embodiment maybe further understood with reference to the following description. The exemplary embodiment of present invention provides a confirmation of many data messages with just one message thereby saving power. The described embodiment implies ability to measure accurately at frequency of received signals at input of base station.

When narrowband radio signals (UNB) are used in LPWAN networks with signal bandwidth of 500 Hz or less, inaccurate frequency shaping by master oscillators can lead to problems associated with mismatch between transmitter and receiver frequencies, which causes packet loss. For UNB signals transmitted from an end device to a base station (uplink), this problem can be solved by processing a wide frequency band. In a reverse direction (downlink), reception of signals, as a rule, is carried out by means of serial radiotransivers, which process only a narrow band of signal. In this case, to successfully receive a signal, it is necessary to accurately match a frequency of signal and a frequency of tuning of input filters of radio transceiver. For example, for signals with a bandwidth of 200 Hz, accuracy of coincidence of frequencies should be of order of several tens of Hertz. To solve this problem, an algorithm can be used to compensate instability of frequencies of master oscillators, essence of which is described below.

Packets are transmitted in both directions at frequencies that are uniquely determined by data contained in a packet. When the packet is received, a real frequency of signal is measured with a certain error and a difference, i.e., an error, between actual and expected signal frequencies is calculated:

$$\Delta f_1 = f_{exp\_ul} - f_{rx}$$

Composition of this error includes both an error of a transmitter of a remote modem and an error of measuring a frequency of a base station:

$$\Delta f_1 = \Delta f_{ul} + \Delta f_{bs}$$

These errors have sufficiently stable values caused by initial inaccuracy of generators, and use of thermally stabilized oscillators (TCXO) do not change significantly with temperature fluctuations.

A base station transmitter, used to send downlink packets, also, with a certain periodicity (every 5 minutes), sends uplink packets at a fixed frequency $f_{exp\_dl}$. These packets are received by the same base station, and the second frequency error is calculated by using the following formula:

$$\Delta f_2 = f_{exp\_dl} - f_{rx}$$

Composition of this error includes both an error of the transmitter of the base station and an error of measuring a frequency of the base station:

$$\Delta f_2 = \Delta f_{dl} + \Delta f_{bs}$$

When sending a downlink packet, the base station compensates a frequency error of a receiver in a modem of a destination device, sending a packet at the following frequency:

$$f_{tx} = f_{exp\_dl} + \Delta f_1 - \Delta f_2 + \Delta f_{dl}^* = f_{exp\_dl} + \Delta f_{ul}$$

$*-\Delta f_{dl}$ is added by the base station transmitter.

$f_{exp\_dl} + \Delta f_{ul}$ corresponds exactly to an actual frequency of the remote modem receiver and includes its error.

These calculations are valid in case when an error in a frequency of the modem is equal to both during reception and transmission. This is true under the following condition:

$$f_{exp\_ul} = f_{exp\_dl}$$

Otherwise, a formula for compensation of frequency errors as follows:

$$f_{tx} = f_{exp\_dl} + f_{exp\_dl} / f_{exp\_ul} \cdot (\Delta f_1 - \Delta f_2)$$

A similar result can be achieved by implementing a receiving part of the radio modem of a final device in such a way that detection and reception of data would be performed in a wider frequency range sufficient to compensate for errors in the reference oscillators. This solution involves abandonment of existing on market serial radio transceivers and implementation or application of receiver with more expensive components with higher power consumption.

What is claimed is:

1. A method of simultaneous confirmation of messages, comprising:

matching frequencies of a transmitter and a receiver by processing a wide frequency band for narrowband signals transmitted from an end device to a base station;

measuring a real frequency of signal with a certain error, and a difference between actual and expected signal frequencies includes:

i) $\Delta f_1 = f_{exp\_ul} - f_{rx}$, where $\Delta f_1$ includes both an error of the transmitter of a remote modem, and ii) an error of measuring a frequency of the base station includes:

$\Delta f_1 = \Delta f_{ul} + \Delta f_{bs}$, where $f_{exp\_ul}$ is the expected frequency of message, $f_{rx}$ is an actual received frequency, $\Delta f_{ul}$ is a true error of the expected frequency, and $\Delta f_{bs}$ is a frequency error of the receiver; and matching a frequency of signal and a frequency of tuning of input filters by a way of an algorithm used to compensate instability of frequencies of master oscillators for narrowband signals transmitted from the base station.

2. The method according to claim 1, wherein a transmitter of the base station sends signal at a fixed frequency $f_{exp\_dl}$ with a certain periodicity, and a second frequency error ($\Delta f_2$) of signal received by the base station includes:

i) $\Delta f_2 = f_{exp\_dl} - f_{rx}$, and ii) the second frequency error includes both an error of the transmitter of the base station and an error of measuring a frequency of the base station:

$\Delta f_2 = \Delta f_{dl} + \Delta f_{bs}$, where $f_{exp\_dl}$ is the expected frequency of message, $f_{rx}$ is the actual received frequency, $\Delta f_{dl}$ is the true error of the expected frequency, and $\Delta f_{bs}$ is the frequency error of the receiver.

3. The method according to claim 1, wherein the base station compensates a frequency error of a receiver for signal sent from the end device to the base station, and a frequency of signal includes:

i) $f_{tx} = f_{exp\_dl} + \Delta f_1 - \Delta f_2 + \Delta f_{dl} = f_{exp\_dl} + \Delta f_{ul}$, where $-\Delta f_{dl}$ is added by the base station transmitter, and ii) $f_{tx} = f_{exp} + \Delta f_{ul}$ corresponds exactly to an actual frequency of a remote modem receiver and includes its error;

iii) calculations are valid wherein an error in a frequency of the remote modem is equal to both during reception and transmission under the condition that $f_{exp\_ul} \approx f_{exp\_dl}$; otherwise, compensation of the frequency error includes:

$f_{tx} = f_{exp\_dl} + f_{exp\_dl}/f_{exp\_ul}(\Delta f_1 - \Delta f_2)$, where $f_{exp\_ul}$ is a required uplink frequency.

4. The method according to claim 1, wherein detection and reception of data are performed in a wider frequency range sufficient to compensate an error in oscillators.

* * * * *